United States Patent
Bradley et al.

(10) Patent No.: US 9,030,071 B2
(45) Date of Patent: May 12, 2015

(54) ELECTRICAL MACHINES

(75) Inventors: Stuart Ian Bradley, Leicestershire (GB); David Alabaster, Warwickshire (GB)

(73) Assignee: GE Energy Power Conversion Technology Ltd, Warwickshire (GB)

(*) Notice: Subject to any disclaimer, the term of this patent is extended or adjusted under 35 U.S.C. 154(b) by 374 days.

(21) Appl. No.: 13/350,866

(22) Filed: Jan. 16, 2012

(65) Prior Publication Data

US 2013/0020893 A1    Jan. 24, 2013

(30) Foreign Application Priority Data

Jan. 19, 2011   (EP) ..................................... 11000370

(51) Int. Cl.
| | | |
|---|---|---|
| H02K 16/04 | (2006.01) |
| H02K 1/27 | (2006.01) |
| H02K 16/00 | (2006.01) |
| H02K 21/12 | (2006.01) |
| H02K 41/03 | (2006.01) |

(52) U.S. Cl.
CPC ............ H02K 1/2786 (2013.01); H02K 1/278 (2013.01); H02K 16/00 (2013.01); H02K 16/04 (2013.01); H02K 21/12 (2013.01); H02K 41/03 (2013.01)

(58) Field of Classification Search
CPC ..... H02K 16/00; H02K 16/02; H02K 5/1672; H02K 16/04; H02K 21/12; H02K 41/03; F16C 33/107
USPC .................................................. 310/112, 90
See application file for complete search history.

(56) References Cited

U.S. PATENT DOCUMENTS

| | | | | |
|---|---|---|---|---|
| 4,517,484 | A * | 5/1985 | Dacier .......................... | 310/266 |
| 6,794,781 | B2 * | 9/2004 | Razzell et al. ................ | 310/114 |
| 7,154,191 | B2 * | 12/2006 | Jansen et al. .................... | 290/55 |
| 7,830,063 | B2 * | 11/2010 | Jansen et al. .................. | 310/266 |
| 2008/0061647 | A1 * | 3/2008 | Schmitt ......................... | 310/112 |
| 2008/0238232 | A1 * | 10/2008 | Bando et al. .................. | 310/126 |
| 2008/0246359 | A1 * | 10/2008 | Lee et al. ....................... | 310/112 |
| 2009/0206684 | A1 * | 8/2009 | Jajtic et al. ................. | 310/12.31 |
| 2010/0219706 | A1 * | 9/2010 | Watanabe et al. ............. | 310/107 |
| 2010/0289365 | A1 * | 11/2010 | Bando et al. ............. | 310/156.01 |

FOREIGN PATENT DOCUMENTS

| | | |
|---|---|---|
| EP | 1612415 A2 | 1/2006 |
| WO | 2004/068678 A1 | 8/2004 |
| WO | 2009/092122 A1 | 7/2009 |

* cited by examiner

*Primary Examiner* — Alex W Mok
(74) *Attorney, Agent, or Firm* — Parks Wood LLC

(57) ABSTRACT

An electrical machine 20, 48 comprises a first stator 22 and a second stator 24 spaced from the first stator 22, at least one of the first stator 22 and the second stator 24 including a guide arrangement 26, 50. The electrical machine 20, 48 also includes a plurality of rotor elements 30, 46 located between the first stator 22 and the second stator 24 and cooperating with the guide arrangement 26, 50 for movement relative to the first stator 22 and the second stator 24. Adjacent rotor elements 30, 46 cooperate with each other so that the rotor elements 30, 46 form a rotor and at least one of the rotor elements 30, 46 includes a coupling element 32 to transfer force to or from the rotor. Each rotor element 30, 46 includes a first support surface 30a which faces towards the first stator 22 and defines a first air gap with the first stator 22, a second support surface 30b which faces towards the second stator 24 and defines a second air gap with the second stator 24, and one or more magnets 34 mounted on each of the first and second support surfaces 30a, 30b in the first and second air gaps.

15 Claims, 8 Drawing Sheets

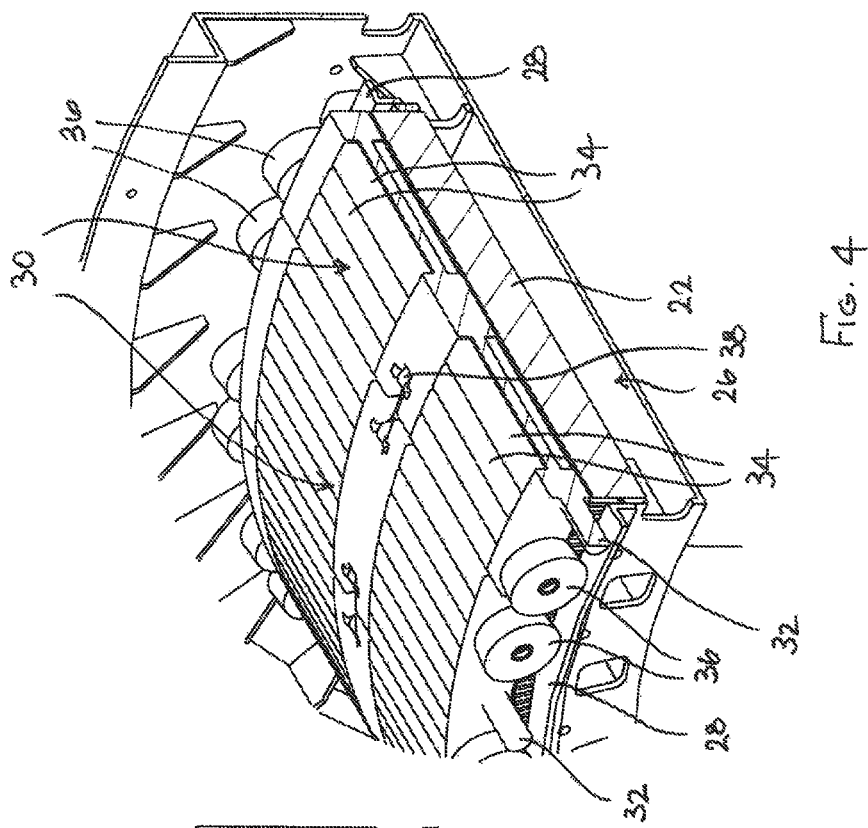
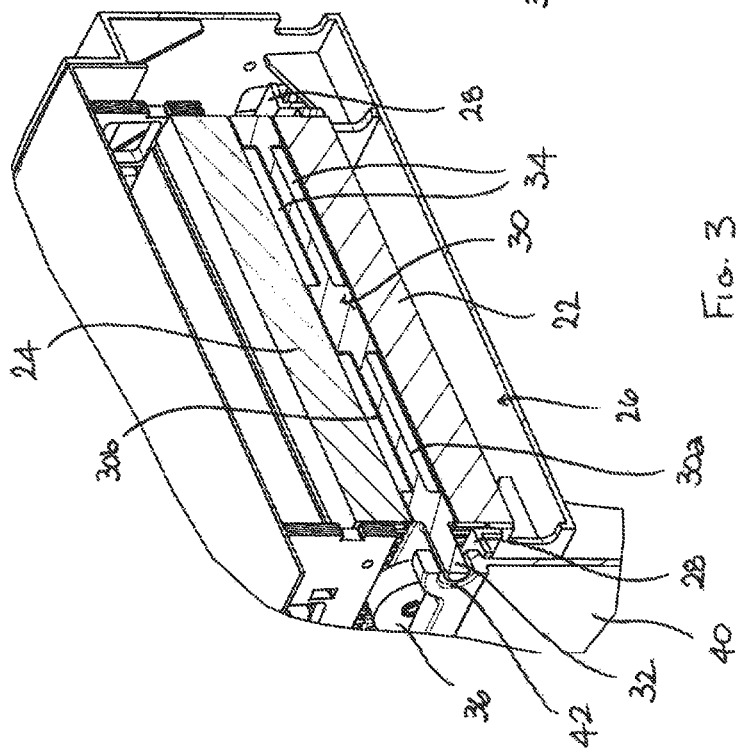

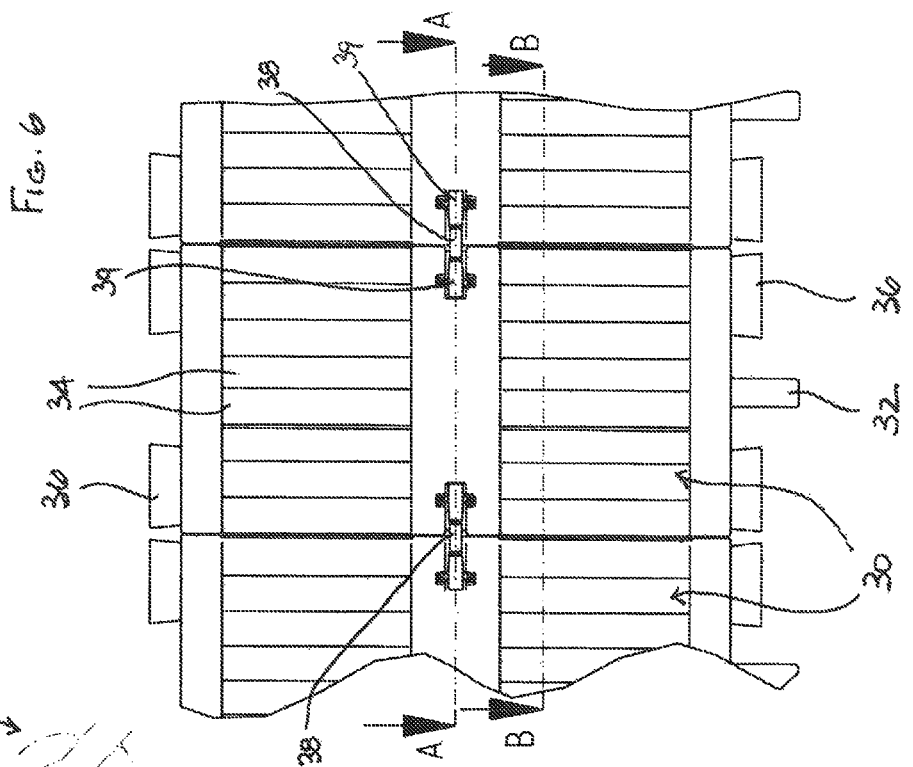
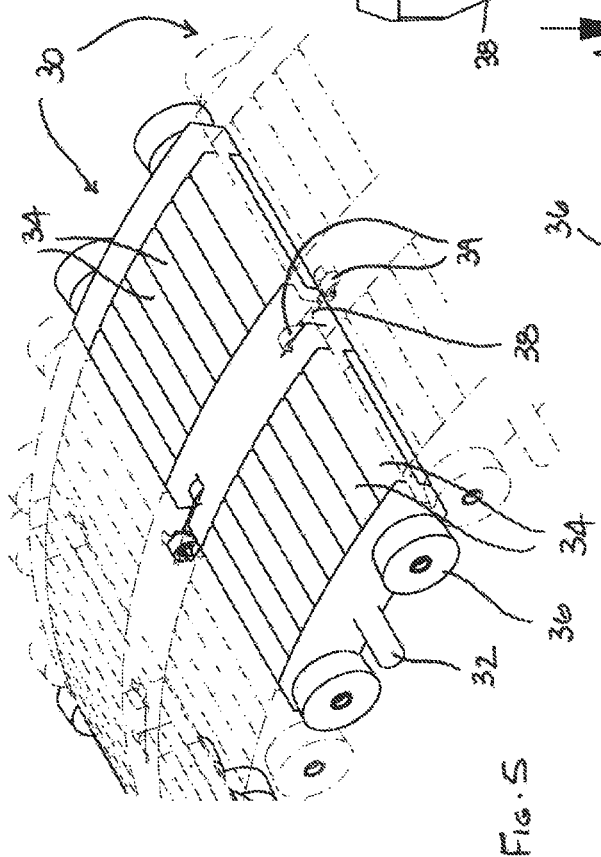
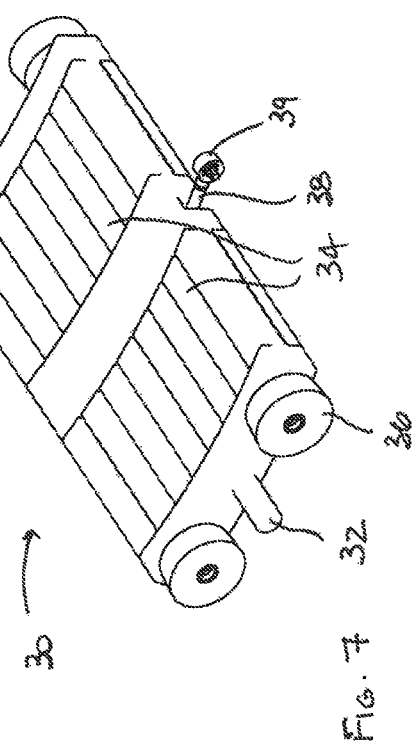

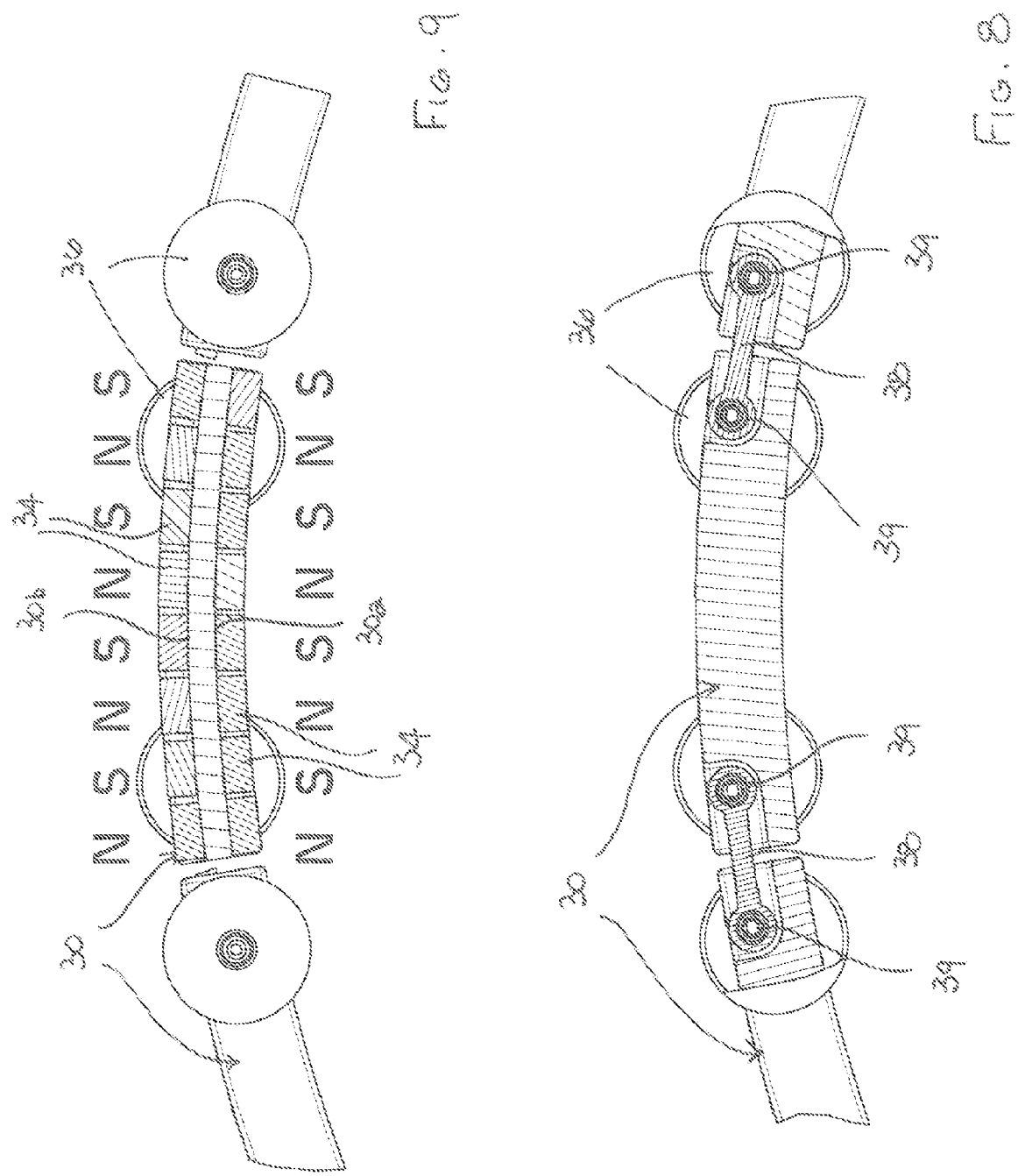

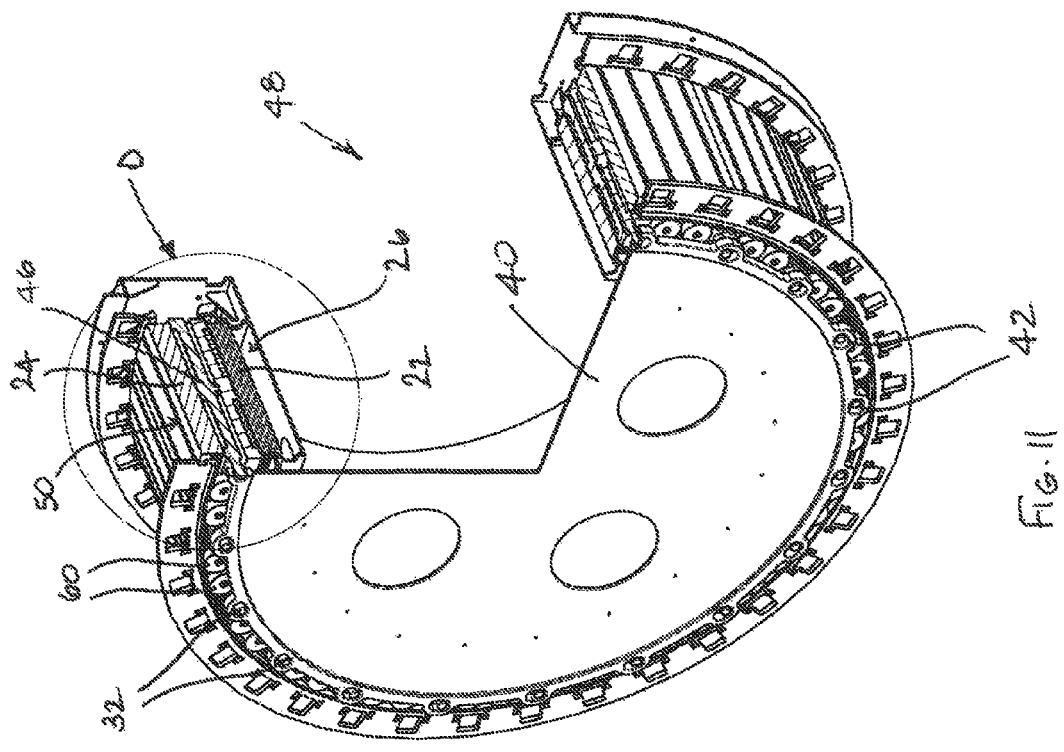
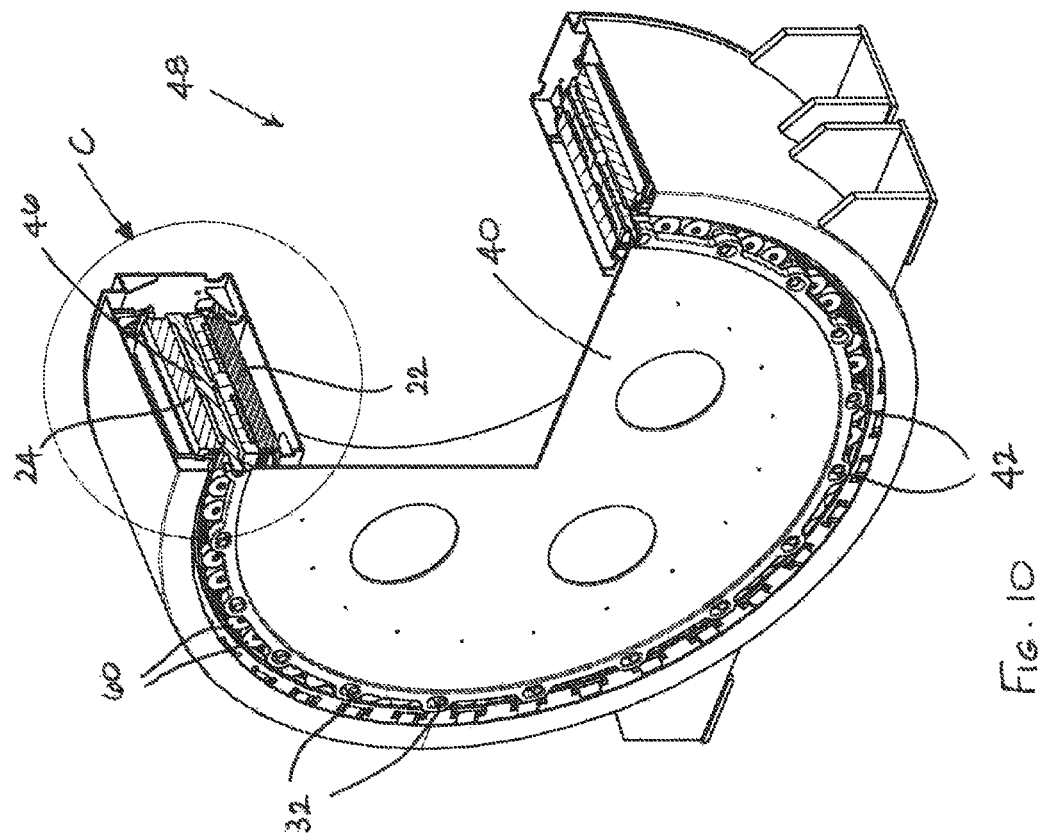

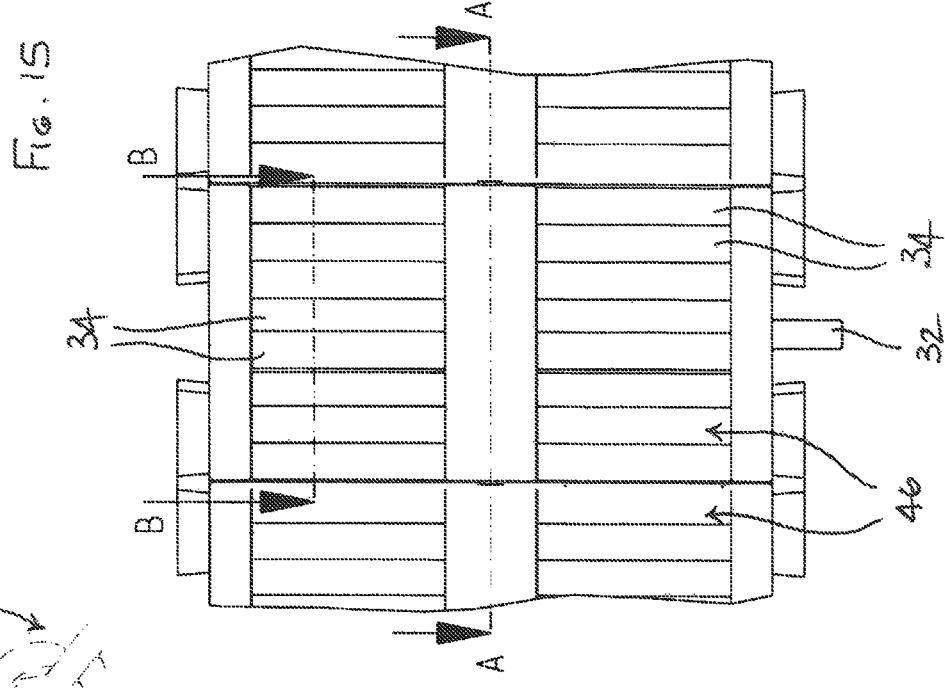
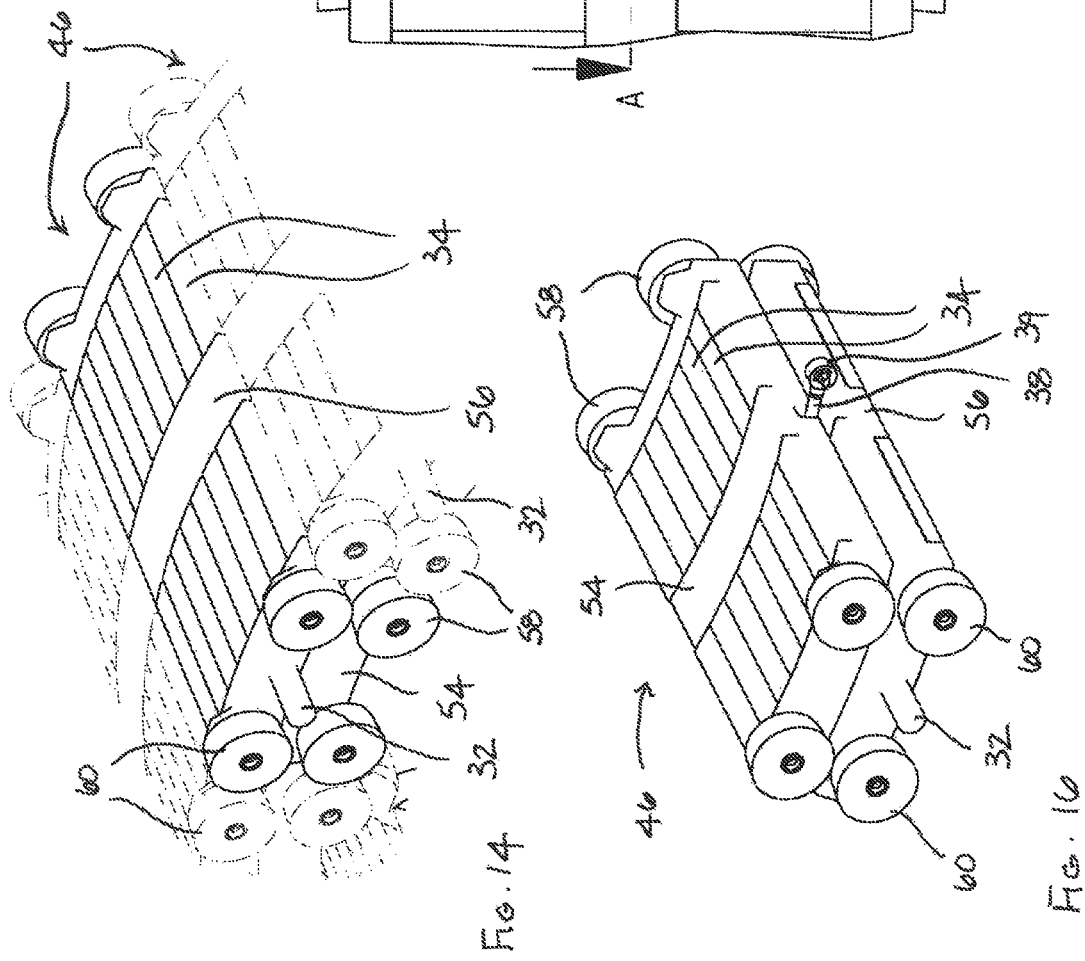

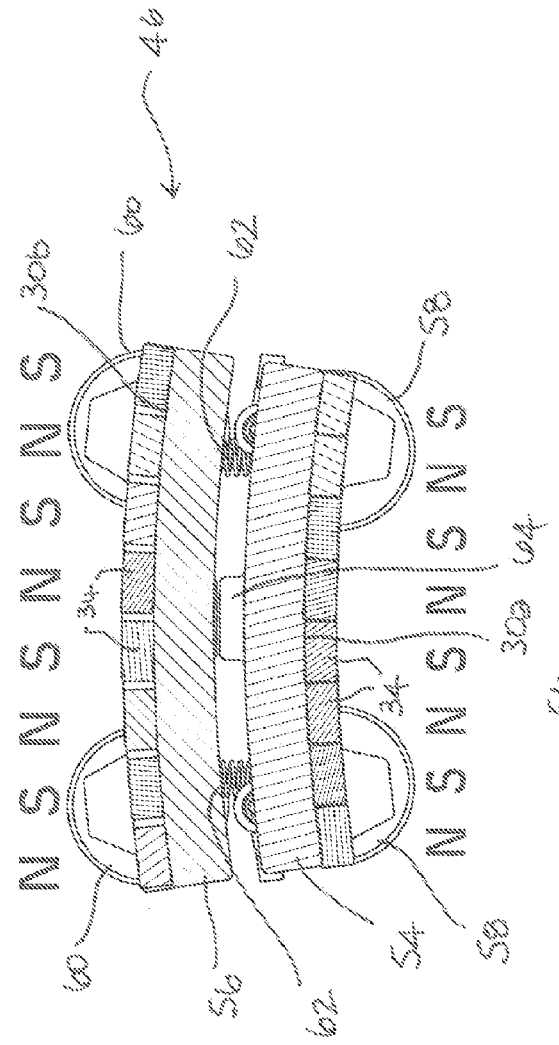
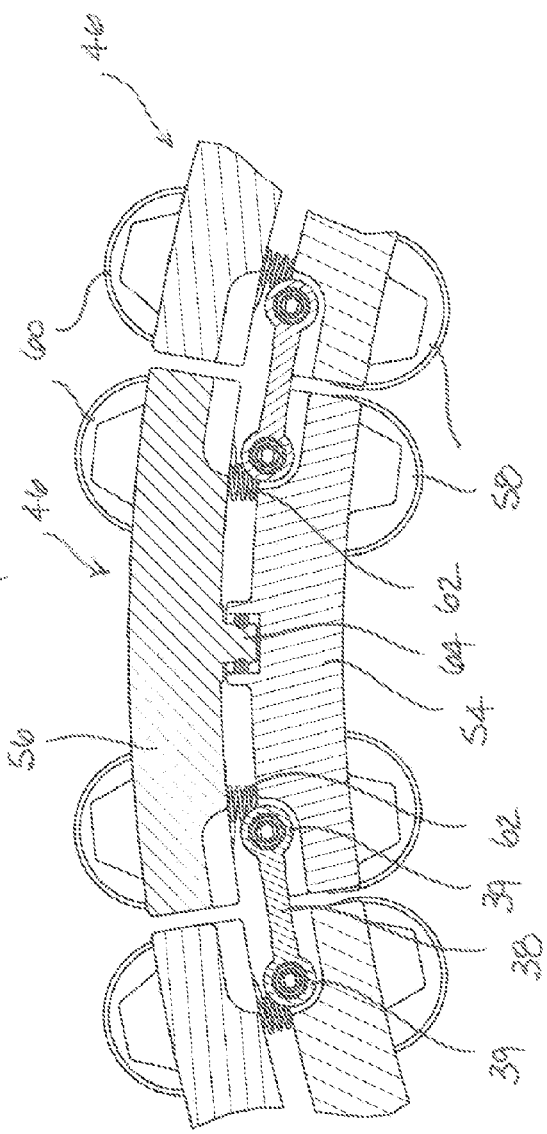

ELECTRICAL MACHINES

FIELD OF THE INVENTION

The present invention relates generally to electrical machines and more particularly to electrical machines having two stators. Embodiments of the present invention relate to a rotor construction for an electrical machine, and in particular but not exclusively to a rotor construction for a rotating electrical machine having internal and external substantially cylindrical stators.

BACKGROUND TO THE INVENTION

Rotating electrical machines typically comprise a cylindrical rotor mounted to rotate around or within an adjacent stator. A rotating electrical machine may thus have an internal substantially cylindrical rotor mounted within an external stator or an outer cylindrical rotor mounted around an internal stator. Some types of rotating electrical machine, such as a double output generator, have both internal and external substantially cylindrical stators with a rotor located between them.

The construction of rotors for low speed high torque rotating electrical machines can be problematic, and this is especially the case for rotating electrical machines that have internal and external cylindrical stators. For example, in a typical permanent magnet generator employed in a direct drive wind turbine, the rotor has a diameter of the order of several meters, whereas the air gaps between the rotor and the adjacent internal and external stators are typically of the order of several millimeters.

Because the air gaps between the rotor and internal and external cylindrical stators are so small compared to the diameter of the rotor, the rotor and the internal and external cylindrical stators must be manufactured with a high degree of roundness and then carefully aligned with each other to provide uniform air gaps. It can be difficult to ensure concentricity and axial alignment of the cylindrical rotor and adjacent cylindrical stators and the manufacture and assembly of rotating electrical machines having internal and external cylindrical stators can thus be complex.

There is, therefore, a need for an electrical machine having an improved rotor construction which overcomes the difficulties mentioned above.

SUMMARY OF THE INVENTION

According to one aspect of the present invention, there is provided an electrical machine comprising:
 a first stator, a second stator spaced from the first stator, one of the first stator and the second stator including a guide arrangement;
 a plurality of rotor elements located between the first stator and the second stator and cooperating with the guide arrangement for movement relative to the first stator and the second stator, adjacent rotor elements cooperating with each other so that the rotor elements form a rotor and at least one of the rotor elements including a coupling element to transfer force to or from the rotor;
 each rotor element including:
  a first support surface facing towards the first stator and defining a first air gap with the first stator;
  a second support surface facing towards the second stator and defining a second air gap with the second stator; and
  one or more magnets mounted on each of the first and second support surfaces in the first and second air gaps.

As a result of the cooperation between each of the rotor elements and the guide arrangement, each of the rotor elements follows the geometry of the guide arrangement, and hence the geometry of the first stator or the second stator (depending on which of the first stator and the second stator includes the guide arrangement). Provided that the first and second stators are correctly mounted relative to each other, each of the rotor elements also follows the geometry of the other of the first and second stators. The manufacturing and assembly difficulties that are particularly associated with the prior art rotating electrical machines described above are thus avoided.

Each rotor element may include at least one rolling element which may cooperate with the guide arrangement. The guide arrangement may be a guide rail.

By mounting magnets with appropriate magnetic strengths on the first and second support surfaces of each rotor element, it is possible to reduce the net magnetic force acting on each rotor element and, hence, on the guide arrangement. This may reduce the complexity of the components used in the manufacture and assembly of the electrical machine and thereby reduce its cost. In particular, the net magnetic force acting on the rolling elements may be reduced. This may enable the use of smaller diameter, and hence higher speed, rolling elements, resulting in reduced component complexity and cost. It would typically be necessary to ensure that the net magnetic force acts to maintain the rolling elements in contact with the guide arrangement.

The first stator may include a first guide arrangement and the second stator may include a second guide arrangement. In this case, each rotor element typically cooperates with both the first and second guide arrangements.

Each rotor element may include a first rotor section that cooperates with the first guide arrangement and a second rotor section that cooperates with the second guide arrangement. The first support surface is typically provided on the first rotor section and the second support surface is typically provided on the second rotor section.

The first and second rotor sections may be movable relative to each other. The first and second rotor sections may be movable relative to each other in multiple directions.

The first and second rotor sections may be movable relative to each other in a direction generally perpendicular to the operational direction of movement of the rotor (i.e. perpendicular to the direction of movement of the rotor during normal operation of the electrical machine). The first and second rotor sections may be resiliently biased apart to maintain contact respectively with the first and second guide arrangements. Manufacture and assembly of the electrical machine is thereby further simplified as the first and second rotor sections are independently guided along the first and second guide arrangements and are thus able to independently follow the geometry of the first and second stators. The electrical machine can, therefore, operate effectively even if there is misalignment between the first and second stators.

When the electrical machine is a rotating electrical machine, the first and second rotor sections may be movable relative to each other in a radial direction and/or in an axial direction. The first and second rotor sections may be resiliently biased apart in the radial direction to maintain contact respectively with the first and second guide arrangements. The ability of the first and second rotor sections to move relative to each other, and in particular to move relative to each other in the radial direction in the case of a rotating electrical machine, ensures that the first and second rotor sections can independently follow the geometry of the first and second guide arrangements and, hence, independently follow the geometry of the first and second stators. Accordingly, it is not necessary for the first and second stators to be fully concentric. When the electrical machine is a rotating electrical machine, the ability of the first and second rotor sections to move relative to each other in the axial direction further ensures that the electrical machine can operate effectively even if there is axial misalignment of the first and second guide arrangements and/or the first and second stators.

Each rotor element may include a coupling member to permit relative movement between the first and second rotor sections. The coupling member may be a multidirectional coupling member. The multidirectional coupling member may be configured to prevent relative movement between the first and second rotor sections in a direction generally parallel to an operational direction of the rotor (i.e. the circumferential direction in the case of a rotating electrical machine).

One or both of the first stator and the second stator may be formed by a plurality of stator segments. This form of stator construction may further facilitate the manufacture and assembly of the electrical machine by making alignment of the first and second stators more straightforward.

Typically, the electrical machine is a rotating electrical machine in which the first stator is an internal substantially cylindrical stator and the second stator is an external substantially cylindrical stator. The internal and external substantially cylindrical stators may be generally concentric. The rotor elements may be arranged circumferentially for rotation about the guide arrangement and may cooperate to form an annular rotor. The first rotor section may thus be located radially inwardly of the second rotor section. When the electrical machine is a rotating electrical machine, for example a generator or motor, the or each coupling element transfers torque to or from the annular rotor.

The guide arrangement may extend circumferentially around the internal substantially cylindrical stator or the external substantially cylindrical stator. In embodiments in which both stators include a guide arrangement, the first guide arrangement may extend circumferentially around the internal substantially cylindrical stator and the second guide arrangement may extend circumferentially around the external substantially cylindrical stator.

Each rotor element may have an arcuate configuration. The curvature of each arcuate rotor element may conform generally to the curvature of the or each adjacent circumferentially extending guide arrangement, and hence the circumferentially extending first and second stators.

The guide arrangement may be formed integrally with the first stator or the second stator or may alternatively be fixed to the first stator or the second stator. The first guide arrangement may be formed integrally with, or may be fixed to, the first stator. The second guide arrangement may be formed integrally with, or may be fixed to, the second stator.

Each rotor element may include a plurality of rolling elements which may cooperate with the first and/or second guide arrangements. The first rotor section may include one or more rolling elements which may cooperate with the first guide arrangement.

The second rotor section may include one or more rolling elements which may cooperate with the second guide arrangement. The or each guide arrangement typically comprises at least two axially spaced guide rails with which the rolling elements cooperate.

The first and second air gaps may be individually adjustable. For example, the first air gap may be adjustable by varying the position of the or each rolling element on the first rotor section to vary the distance between the first support surface and the first stator. The second air gap may be adjustable by varying the position of the or each rolling element on the second rotor section to vary the distance between the second support surface and the second stator.

Adjacent rotor elements may contact each other. This contact between adjacent rotor elements may be sufficient to provide the cooperation between adjacent rotor elements that is necessary to form the rotor. Cooperation by virtue of contact between adjacent rotor elements may be sufficient particularly when the electrical machine is a uni-directional electrical machine.

Adjacent rotor elements may be linked together to provide the necessary cooperation between adjacent rotor elements so that the plurality of rotor elements together form the rotor. At least one link element may be provided between each adjacent pair of rotor elements to link the rotor elements and thereby form the rotor.

In some embodiments, each of the rotor elements may include a coupling element to transfer force to or from the rotor. In other embodiments, the electrical machine may include several coupling elements, one or more of which may be operable to transmit force to or from a subset of the plurality of rotor elements.

In embodiments in which the electrical machine is a rotating electrical machine, the rotating electrical machine may include a rotating shaft carrying a rotatable coupling and the one or more coupling elements may engage the rotatable coupling. The or each coupling element may comprise a projection which may be engageable in a corresponding recess in the rotatable coupling. When the rotating electrical machine is a generator, torque can thus be transferred to the annular rotor from the rotating shaft via the rotatable coupling and the one or more coupling elements. When the rotating electrical machine is a motor, torque can thus be transferred to the rotating shaft from the annular rotor via the one or more coupling elements and the rotatable coupling.

The electrical machine may be a permanent magnet electrical machine and one or more permanent magnets may, thus, be mounted on the first and second support surfaces of each rotor element. The electrical machine may alternatively be an electromagnetic electrical machine and one or more electromagnets may, thus, be mounted on the first and second support surfaces of each rotor element.

The electrical machine could, for example, be a double output generator in which electrical power is supplied from both the first and second stators. In the case of a double output generator, the power supplied from each stator could have a different voltage and/or waveform, etc. The electrical machine may be particularly suitable for renewable energy applications in which wind, wave, tidal energy or water current flows are converted into electrical energy by using a turbine to drive the rotor of the electrical machine.

The electrical machine could be a linear electrical machine. Thus, the first stator may be a first linear stator and the second stator may be a second linear stator. The rotor elements may cooperate to form a linear rotor (i.e. a translator).

BRIEF DESCRIPTION OF THE DRAWINGS

FIGS. 3 and 4 are enlarged views of the regions identified as 'A' and 'B' in FIGS. 1 and 2 respectively;

FIG. 5 is a diagrammatic perspective view showing the detail of the rotor construction used in the rotating electrical machine of FIG. 1;

FIG. 6 is a radially inward looking view of part of the rotor construction illustrated in FIG. 5;

FIG. 7 is a diagrammatic perspective view of the underside of a rotor element forming part of the rotor construction of FIGS. 5 and 6;

FIGS. 8 and 9 are sectional views along the lines A-A and B-B respectively in FIG. 6;

FIG. 10 is a diagrammatic perspective cut-away view of a radial flux rotating electrical machine according to another embodiment of the present invention;

FIG. 11 is a diagrammatic perspective view of the rotating electrical machine of FIG. 10 in which some of the machine components have been omitted for the purposes of clarity;

FIG. 14 is a diagrammatic perspective view showing the detail of the rotor construction used in the rotating electrical machine of FIG. 10;

FIG. 15 is a radially inward looking view of part of the rotor construction illustrated in FIG. 14;

FIG. 16 is a diagrammatic perspective view of the underside of a rotor element forming part of the rotor construction of FIGS. 14 and 15; and FIGS. 17 and 18 are sectional views along the lines A-A and B-B respectively in FIG. 15.

DETAILED DESCRIPTION OF EMBODIMENTS OF THE INVENTION

Embodiments of the present invention will now be described by way of example only and with reference to the accompanying drawings.

Referring initially to FIGS. 1 to 9, a radial flux rotating electrical machine 20 comprises a radially inner first cylindrical stator 22 and a radially outer second cylindrical stator 24 which is positioned radially outwardly of the first cylindrical stator 22. The first and second cylindrical stators 22, 24 are substantially concentric.

Figure 1:
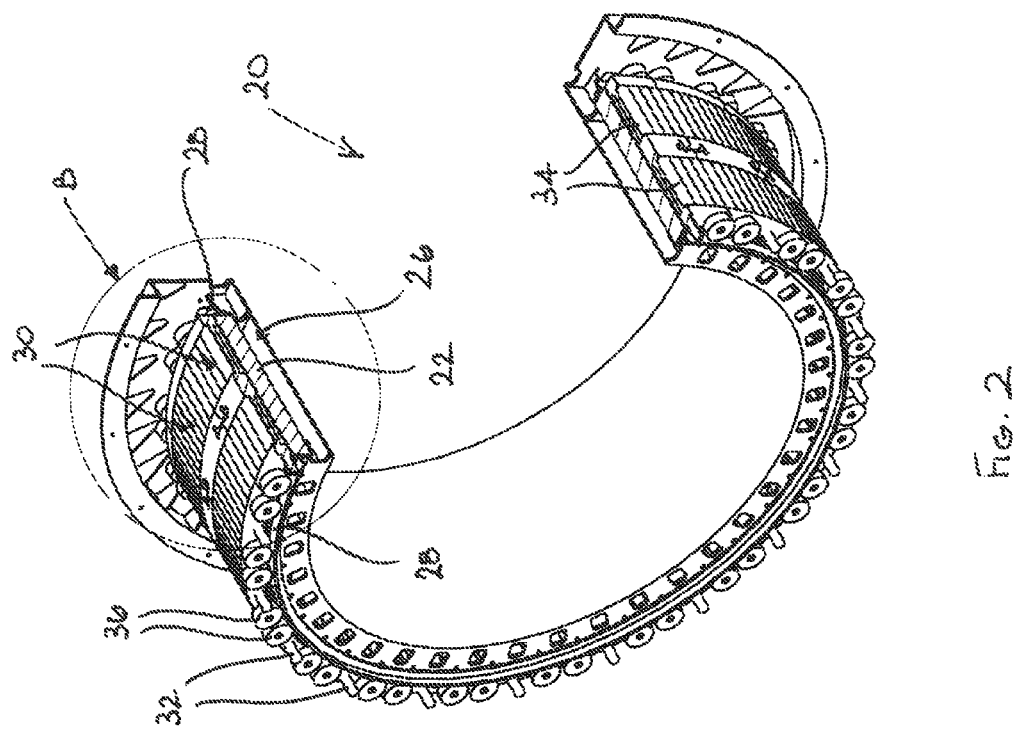
FIG. 1 is a diagrammatic perspective cut-away view of a radial flux rotating electrical machine according to one embodiment of the present invention.
Figure 2:
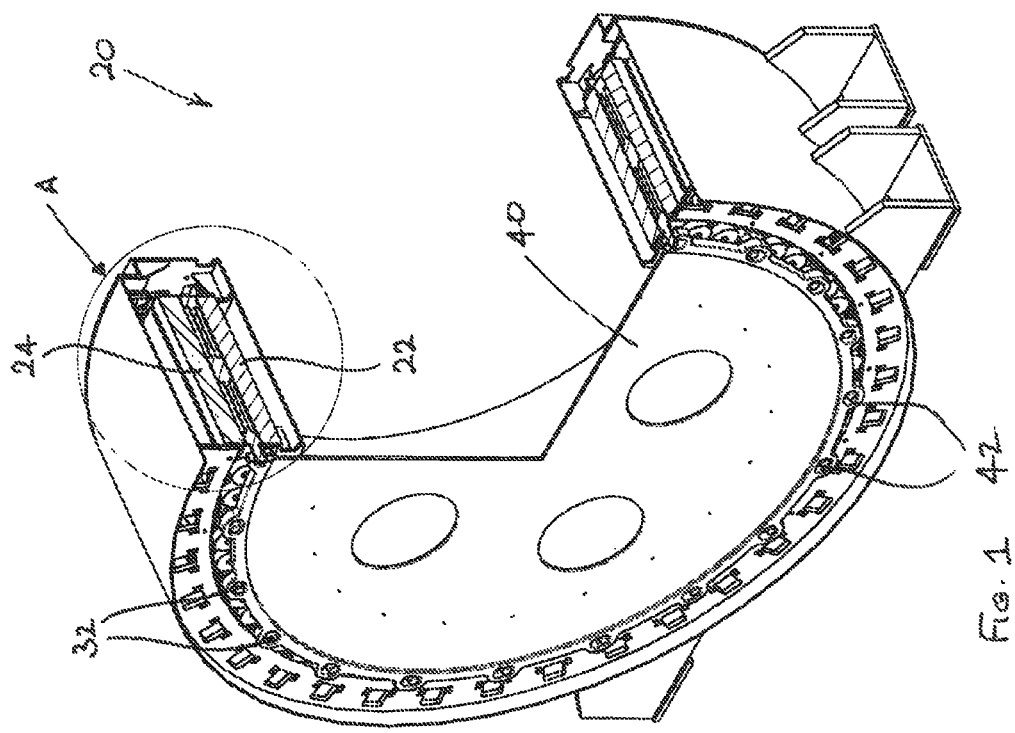
FIG. 2 is a diagrammatic perspective view of the rotating electrical machine of FIG. 1 in which some of the machine components have been omitted for the purposes of clarity.

The first cylindrical stator 22 includes a circumferentially extending guide arrangement 26 which includes two axially spaced circumferential guide rails 28 (best seen in FIGS. 2 and 4). The rotating electrical machine 20 also includes a plurality of circumferentially arranged rotor elements 30 which cooperate with the guide rails 28 for rotation relative to the first and second cylindrical stators 22, 24. The rotor elements 30 cooperate with each other in the circumferential direction to form a continuous annular centerless rotor and each rotor element 30 includes a coupling element 32 which enables torque transfer to or from a rotating shaft (not shown), the direction of torque transfer being dependent on whether the rotating electrical machine 20 is operating as a generator or a motor.

Each rotor element 30 includes a first support surface 30a which faces in a radially inward direction towards the first stator 22 to define a first air gap and a second support surface 30b which faces in a radially outward direction towards the second stator 24 to define a second air gap. A plurality of permanent magnets 34 are mounted on the first and second support surfaces 30a, 30b in the first and second air gaps. If the rotating electrical machine operates an electrical generator, electrical power can be supplied from each of the first and second stators 22, 24. The electrical power supplied by each of the first and second stators 22, 24 may, for example, have a different voltage and/or a different waveform such that the rotating electrical machine 20 operates as a double output generator.

Each rotor element 30 has an arcuate shape which conforms generally to the curvature of the adjacent first and second stators 22, 24. In the illustrated embodiment, the permanent magnets 34 are bonded to the first and second support surfaces 30a, 30b, but they could alternatively be affixed to the first and second support surfaces 30a, 30b by mechanical fixings or by any other suitable means. The permanent magnets 34 could alternatively be located in a housing or carrier which could be secured to the first and second support surfaces 30a, 30b of each rotor element 30.

Each rotor element 30 includes two pairs of axially spaced rolling elements 36 mounted on rolling element supports. The rolling elements 36 cooperate with a radially outer surface of the axially spaced circumferential guide rails 28, as best seen in FIG. 4, and thereby rotatably guide each rotor element 30 about the guide rails 28 and, hence, about the first and second cylindrical stators 22, 24. The cylindrical guide rails 28 conform generally to the shape of the first cylindrical stator 22. The cooperation between the rolling elements 36 and the guide rails 28 thus rotatably guides each rotor element 30 relative to the first stator 22 and ensures that each rotor element 30 closely follows the contour of the first stator 22, maintaining a substantially constant air gap between the permanent magnets 34 and the first stator 22. Because the first and second cylindrical stators 22, 24 are substantially concentric, each rotor element 30 also closely follows the contour of the second stator 24 and maintains a substantially constant air gap between the permanent magnets 34 and the second stator 24.

The rolling element supports are an integral part of each rotor element 30. In some embodiments, the position of the rolling elements 36 relative to the rolling element supports may be varied, for example by varying the dimensions of a bearing used to mount each rolling element 36. This may enable the first and second air gaps to be adjusted as necessary.

The rotor elements 30 are linked in the circumferential direction and each rotor element 30 includes a link element 38 in the form of a strut member to link it to an adjacent rotor element 30.

Each link element 38 is very stiff and typically rigid along its length, in the circumferential direction of the rotating electrical machine 20, and the circumferentially linked rotor elements 30 effectively act as a torsionally solid mass to form the annular rotor. Each link element 38 is rotatably coupled to adjacent rotor elements 30, by suitable bushings 39 as best seen in FIG. 8. Relative movement between adjacent linked rotor elements 30 is thus possible in the radial direction of the rotating electrical machine 20, allowing individual rotor elements 30 to follow the contour of the guide rails 28 and, hence, the first cylindrical stator 22. Each link element 38 also typically allows for limited relative movement between adjacent linked rotor elements 30 in the axial direction of the rotating electrical machine 20, to compensate for any axial misalignment between adjacent linked rotor elements 30.

The rotating electrical machine 20 includes a rotatable coupling member 40 which is mounted on a rotating shaft (not shown) of the electrical machine 20 for rotation with the shaft. The rotatable coupling member 40 cooperates with the coupling elements 32 to allow torque transfer between the rotating shaft and the centerless annular rotor formed by the plurality of circumferentially linked rotor elements 30, either from the rotating shaft to the annular rotor (when the rotating electrical machine 20 operates as a generator) or from the annular rotor to the rotating shaft (when the rotating electrical machine 20 operates as a motor).

The rotatable coupling member 40 comprises a disc having a plurality of circumferentially spaced recesses 42 around its periphery. A coupling element 32 is located in each recess 42, as best seen in FIG. 3, and a rigid connection is thus provided for the purpose of torque transfer.

Referring now to FIGS. 10 to 18, there is shown an alternative embodiment of a rotating electrical machine 48 according to the present invention having a modified rotor construction. The rotating electrical machine 48 is similar to the rotating electrical machine 20 described above with reference to FIGS. 1 to 9 and corresponding components are, therefore, identified using corresponding reference numerals.

Figure 13:
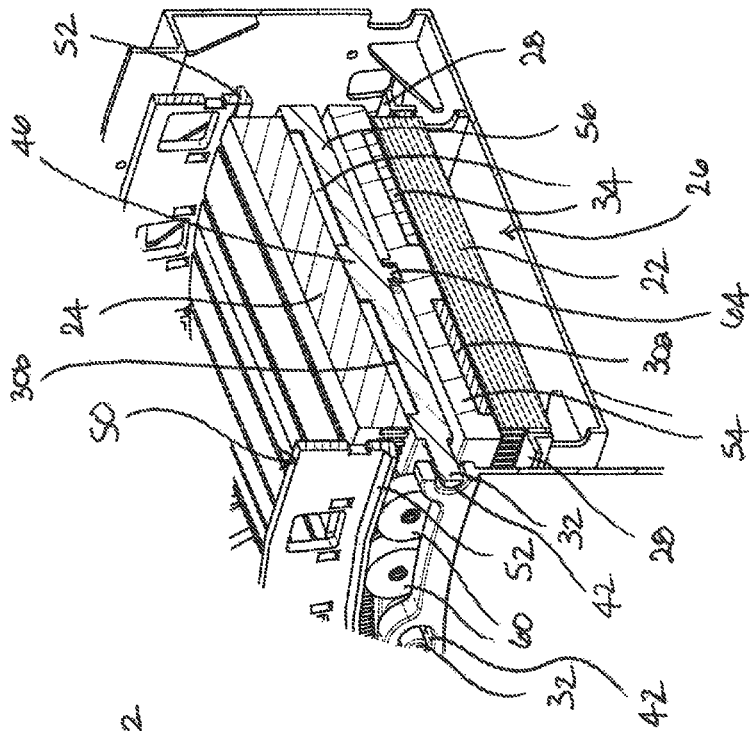
FIGS. 12 and 13 are enlarged views of the regions identified as and 'D' in FIGS. 10 and 11 respectively.
Figure 12:
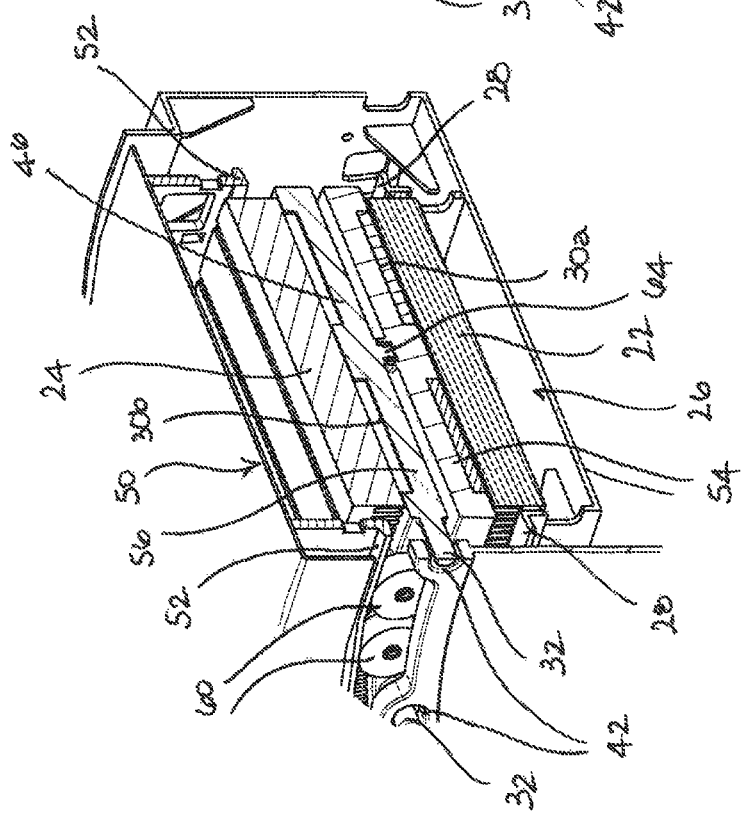

The second cylindrical stator 24 of the rotating electrical machine 48 includes a circumferentially extending guide arrangement 50 which, like the circumferentially extending guide arrangement 26 provided on the first cylindrical stator 24, includes two axially spaced circumferential guide rails 52 (best seen in FIGS. 12 and 13).

Each rotor element 46 includes a radially inner first rotor section 54 and a radially outer second rotor section 56. The first support surface 30a is provided on the first rotor section 54 and the second support surface 30b is provided on the second rotor section 56. Each of the first and second rotor sections 54, 56 includes two pairs of rolling elements 58, 60. The rolling elements 58 of each first rotor section 54 cooperate with the circumferential guide rails 28 of the radially inner first cylindrical stator 22 and the rolling elements 60 of each second rotor section 56 cooperate with the circumferential guide rails 52 of the radially outer second cylindrical stator 24.

Each rotor element 46 includes radially oriented tension springs 62 which resiliently bias the first and second rotor sections 54, 56 apart in the radial direction. The rolling elements 58 mounted on each first rotor section 54 are thus urged into contact with the circumferential guide rails 28 on the first cylindrical stator 22 whilst the rolling elements 60 mounted on each second rotor section 56 are urged into contact with the circumferential guide rails 52 on the second cylindrical stator 24. This enables the first and second rotor sections 54, 56 to independently follow the contour of the first and second stators 22, 24. The first and second air gaps are thus maintained even if there is a lack of concentricity or radial misalignment between the first and second stators 22, 24.

Each rotor element 46 includes a coupling member 64 which controls the relative movement between the first and second rotor sections 54, 56. In the illustrated embodiment, the coupling member 64 comprises a rolling bush which allows the first and second rotor sections 54, 56 to move relative to each other in the radial direction, thereby ensuring that the radially biased apart first and second rotor sections 54, 56 can independently follow the geometry of the respective pairs of circumferential guide rails 28, 52. The rolling bush prevents any relative movement between the first and second rotor sections 54, 56 in the circumferential direction to ensure that each of the first and second rotor sections 54, 56 forms a torsionally solid rotor element 46. The rolling bush may permit some limited relative movement between the first and second rotor sections 54, 56 in the axial direction to compensate for possible axial misalignment between the respective pairs of circumferential guide rails 28, 52 and, hence, between the first and second stators 22, 24.

The remaining features of the rotating electrical machine 48 are as described above with reference to FIGS. 1 to 9.

Although embodiments of the invention have been described in the preceding paragraphs with reference to various examples, it should be understood that various modifications may be made to those examples without departing from the scope of the present invention, as claimed.

Although the electrical machine according to embodiments of the present invention has been described as a radial flux rotating electrical machine, it could be embodied as an axial flux rotating electrical machine or as a linear electrical machine.

What is claimed is:

1. An electrical machine comprising:
a first stator, a second stator spaced from the first stator, one of the first stator and the second stator including a guide arrangement;
a plurality of rotor elements located between the first stator and the second stator and cooperating with the guide arrangement for movement relative to the first stator and the second stator, adjacent rotor elements cooperating with each other so that the rotor elements form a rotor and at least one of the rotor elements including a coupling element to transfer force to or from the rotor;
each rotor element including:
a first support surface facing towards the first stator and defining a first air gap with the first stator;
a second support surface facing towards the second stator and defining a second air gap with the second stator;
one or more magnets mounted on each of the first and second support surfaces in the first and second air gaps; and
two pairs of axially spaced rolling elements mounted thereon and the rotor element encases opposing ends of the first support surface and the second support surface.

2. The electrical machine of claim 1, wherein the first stator and the second stator each include a respective first and second guide arrangement and each rotor element cooperates with both the first and second guide arrangements.

3. The electrical machine of claim 2, wherein each rotor element includes a first rotor section that cooperates with the first guide arrangement and a second rotor section that cooperates with the second guide arrangement.

4. The electrical machine of claim 3, wherein the first support surface is provided on the first rotor section and the second support surface is provided on the second rotor section.

5. The electrical machine of claim 3, wherein the first and second rotor sections are movable relative to each other.

6. The electrical machine of claim 5, wherein each rotor element includes a coupling member to permit said relative movement between the first and second rotor sections.

7. The electrical machine of claim 6, wherein the coupling member is configured to prevent relative movement between the first and second rotor sections in an operational direction of the rotor.

8. The electrical machine of claim 5, wherein the first and second rotor sections are resiliently biased apart and into contact respectively with the first and second guide arrangements.

9. The electrical machine of claim 1, wherein the electrical machine is a rotating electrical machine in which the first stator is an internal substantially cylindrical stator and the second stator is an external substantially cylindrical stator, the internal and external substantially cylindrical stators being substantially concentric, the rotor elements being arranged circumferentially for rotation about the guide arrangement and cooperating in the circumferential direction to form an annular rotor.

10. The electrical machine of claim 2, wherein the electrical machine is a rotating electrical machine in which the first stator is an internal substantially cylindrical stator and the second stator is an external substantially cylindrical stator, the internal and external substantially cylindrical stators being substantially concentric, the rotor elements being arranged circumferentially for rotation about the guide arrangement and cooperating in the circumferential direction to form an annular rotor.

11. The electrical machine of claim 10, wherein the first guide arrangement extends circumferentially around the internal substantially cylindrical stator.

12. The electrical machine of claim 10, wherein the second guide arrangement extends circumferentially around the external substantially cylindrical stator.

13. The electrical machine of claim 11, wherein the second guide arrangement extends circumferentially around the external substantially cylindrical stator.

14. The electrical machine of claim 1, wherein adjacent rotor elements contact each other to provide said cooperation between adjacent rotor elements.

15. The electrical machine of claim 1, wherein adjacent rotor elements are linked together to provide said cooperation between adjacent rotor elements.

* * * * *